J. BAXTER.
Bean Puller.

No. 42,548.

Patented May 3, 1864.

Witnesses:
W. B. Loughborough
Richard Gilbert

Inventor:
Joel Baxter

UNITED STATES PATENT OFFICE.

JOEL BAXTER, OF NORTH GREECE, NEW YORK.

MACHINE FOR PULLING BEANS.

Specification forming part of Letters Patent No. 42,548, dated May 3, 1864.

*To all whom it may concern:*

Be it known that I, JOEL BAXTER, of Greece, in the county of Monroe and State of New York, have invented a new and useful Machine for Pulling Beans; and I do hereby declare that the following is a full, clear, and exact description thereof, reference being had to the accompanying drawings, making part of this specification, in which—

Figure 1:
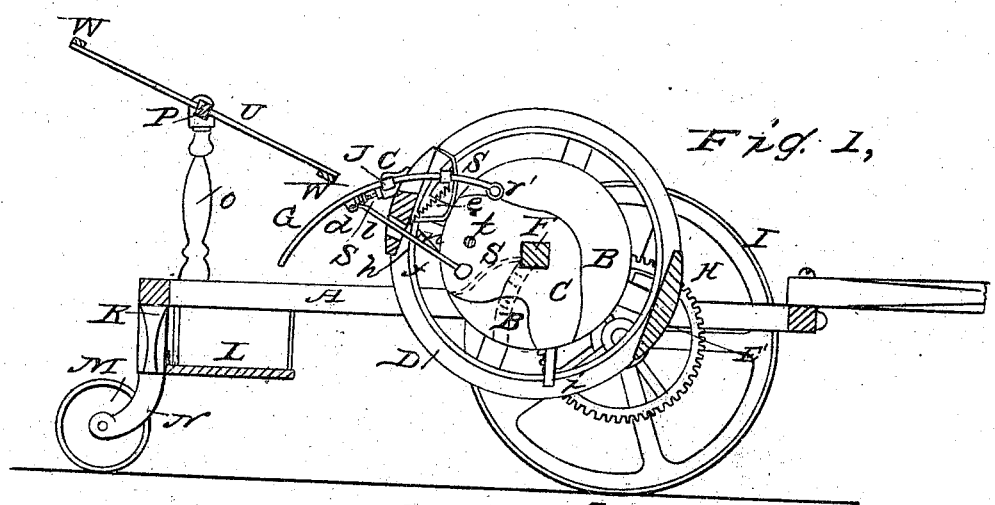
Figure 2:
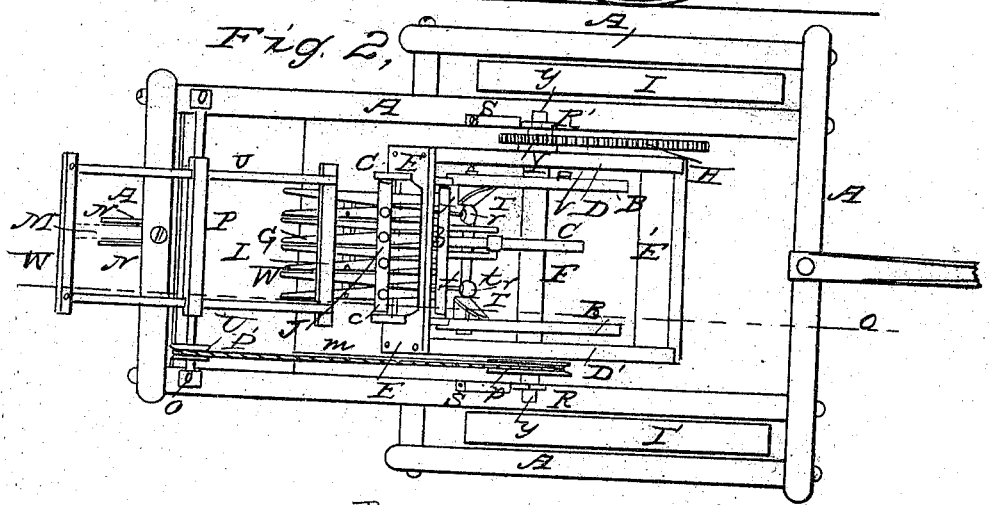
Figure 3:
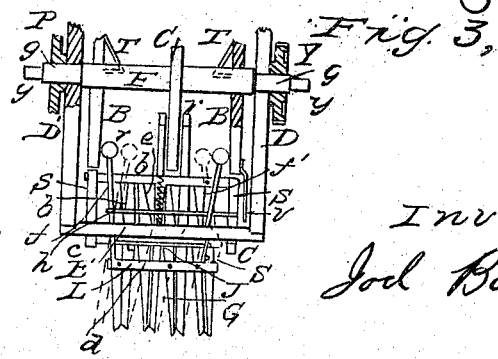

Figure 1 is a vertical section of the machine, taken in the direction of the red line $o$ in Fig. 2. Fig. 2 is a plan or top view of the same. Fig. 3 is a front view of the pullers G swung under the shaft F, and shown as clamped upon the beans.

Similar letters of reference indicate corresponding parts in the several figures.

This invention consists in the construction of a machine to harvest beans by pulling them up by the roots and depositing them upon a platform, from which they may be thrown into gavels of suitable size.

To enable others to make and use my invention, I will proceed to describe its construction and operation.

The several letters A in the drawings represent the frame of the machine, which is supported in front by the driver-wheels I and I' and in rear by an ordinary caster-wheel, M, the shank N of which is pivoted to the stud K of the frame A. The driving-wheel I may be locked to its journal, when desired, by any ordinary clutch, and the spur-wheel H is permanently keyed to the journal and gears into the pinion Y, Fig. 2, which is bolted to the head D. The shaft F is supported by two segmental hangers, R'. These are slotted to receive set-bolts for attaching them to the frame, and they are kept in position by latches S, catching in notches in their upper edges. The ends $y$ of the shaft F are squared to fit the mortise in the upper end of the segments, and this prevents the shaft from turning. The heads B and irregular-shaped cam C do not revolve, being hung upon the inner square portion of the shaft. The pinion Y is fixed to the head D and the pulley $p$ to the head D', and they all revolve upon the turned portions $g$, Fig. 3, of the shaft, both heads D and D' being rigidly connected together by the bars E and E'.

The axial bar J of the gatherers or pullers G is hinged to bar E by the boxes $c$. The inner end of the pullers are supported by the bar $b$, and it extends at each end within the stirrups $s$, which limit the rocking movement of the pullers when receiving and discharging their load. The bars J and $b$ are split to receive the pullers G. That on the right in Fig. 3 and each alternate one is rigidly fixed to the bars J and $b$, and every alternate one is pivoted to the bar J and its end is allowed to swing in bar $b$. These latter are also pivoted to the sliding bar $d$, as seen in Figs. 2 and 3. The setting-bar $f$ is hinged to one end of bar $d$, while one end of the strap-spring $s'$, which is attached to one of the fixed pullers, connects with the other end, and the bar $f'$ is hinged to the outside fixed puller, Fig. 3. The bars $f$ and $f'$ are hinged together by the rod $i$, and one end of the latch $h$ is pivoted to $f$, and the other end passes between $f'$ and the strap-spring $n$. (Seen in Fig. 1.) Two of the fixed gatherers or pullers are lengthened inward and carry the traverse-roller $r'$, which is made to follow the face of the cam C by the spiral spring $e$, Fig. 1. The rollers $r$ are forced toward each other as they are carried around by the cams T, as seen in Fig. 2, when the hook provided on the rod $h$ catches and holds the bar $f'$ until it is again released by the lug $v$ striking the end of the rod or latch $h$ as it is carried around, which unhooks it. The reel P is hung in suitable standards, O, and is driven by the crossed band $m$ and pulleys $p$ and $p'$, the former being attached to the wheel D'. The relative speed of the wheels D and D' with the driving-wheels may be regulated according to the number of sets of pullers G used in the machine, which may be two, three, or any other number desired. The speed of the reel should be so regulated that a wing, W, shall always meet the pullers immediately after they are opened to deliver, and thus secure the discharge of the beans. It should be run considerably faster than the pullers.

The object of the depression in the lower face of the cam C is to permit the pullers to retain a horizontal position while they are closing upon and clasping the stalks of the standing beans, after which the sudden return of the roller $r'$ from this depression to the outer circle again causes the pullers to rock upon their axis, and thus produces a very quick upward movement of them, thereby effecting the withdrawal of the roots from the earth.

There may be other devices substituted for the reel; or, by allowing the pullers to turn upward upon their axis while delivering their load, there may be attached a delivery-board, running up from the front edge of the platform L to a point that shall just clear the bar $d$, and the pullers G, by drawing across the edge of this board, would be effectually and entirely cleared.

There may be springs placed between the inner ends of the pullers; and, instead of pivoting each alternate one to the bar $d$, the pivot may be so placed as to operate against the springs when the pullers are to be opened. This independent action would permit any two of the fingers of the pullers to close upon a small stalk or stalks while the others were clasping larger ones, each pair of fingers thereby adjusting themselves to the size of the stalks which they grasp.

The axis of the puller-wheels D and D' is made adjustable vertically, so as to adapt the machine to hard or soft ground, as it will settle less in one than in the other, and also to the different heights to which different "patches" and kinds of beans grow, and by means of the circular standards or hangers R' the spur-wheel H and pinion Y always remain in gear whatever the adjustment of the puller-wheels may be.

The adjustment of the fingers or pullers G may be effected by the bar $f$ alone by substituting for $f'$ a fixed standard to hold the spring $n$ and to catch the notch of the latch $h$, and attaching the end of the fulcrum or spreader bar $i$, which now connects with $f'$, to one of the fixed pullers G; or $f$ may have its fulcrum in the bar E.

What I claim as my invention, and desire to secure by Letters Patent, is—

1. The employment, in bean-harvesters, of the pullers G, having a horizontal lateral axis, upon which they may be rocked.

2. Attaching the axial shaft J of the pullers G to the periphery of the wheels D and D', substantially in the manner and for the purpose set forth.

3. The combination of the cam C with the pullers G and spring $e$, or its equivalent, they being constructed, arranged, and operating substantially as and for the purposes set forth.

4. The combination of the setting-bars $f$ and $f'$, latch $h$, and spring $n$ with the compressing-cams T, arranged and operating substantially as set forth, and for the purpose described.

5. Closing the pullers G, as seen in Fig. 3, by means of the spring S' or its equivalent, bars $f$ and $f'$, arranged and operating in combination with the lug $v$, substantially as shown and described.

6. The arrangement of the reel P so as to operate in combination with the revolving pullers G, substantially in the manner and for the purpose set forth.

JOEL BAXTER.

Witnesses:
WM. S. LOUGHBOROUGH,
LYMAN M. NEWTON.